Feb. 7, 1928.

L. P. LYNCH

SLEET REMOVER

Filed April 26, 1926

Inventor
Laurence P. Lynch

By Clark C. Wood
Attorney

Patented Feb. 7, 1928.

1,658,384

UNITED STATES PATENT OFFICE.

LAURENCE P. LYNCH, OF LANSING, MICHIGAN.

SLEET REMOVER.

Application filed April 26, 1926. Serial No. 104,848.

Figure 1:
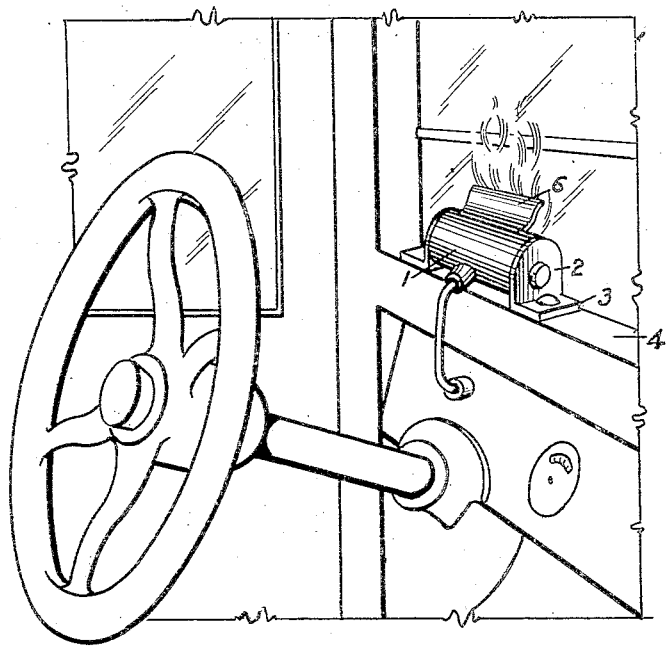
Figure 2:
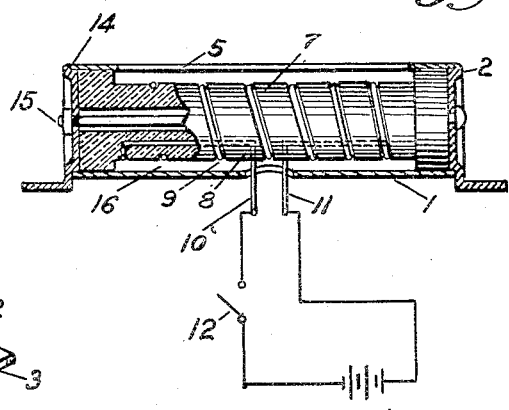
Figure 3:
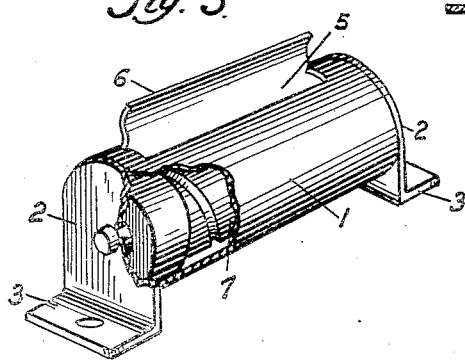

My invention relates to devices for preventing the accumulation of rain, snow, and sleet on the windshield of motor vehicles and its purposes are to make a device that shall be cheap in construction, easily and securely applied, and which shall operate effectively whether the windshield is closed or partially open. I attain these purposes by the means shown in the accompanying drawings, in which Figure 1 is a perspective of a part of the front and windshield of an automobile showing the device in position. Figure 2 is a longitudinal view partly in diagram and partly in section showing the interior construction of the device and Figure 3 is an enlarged perspective view of the device, part of the outer casing being broken away.

Referring more particularly to the drawings, 1 is the main body or outer case of my device which is provided with removable end brackets 2 having flanges 3 adapted to be attached in any suitable position, preferably on the framework 4 of the windshield of a motor vehicle. The case 1 is provided with an opening 5 having an outwardly and forwardly extending flange or guide 6 extending toward but not quite reaching the windshield when in its closed position. A heating coil 7 composed preferably of a central core 8 composed of a suitable insulating material, having a resistance wire 9 wound spirally around it, is removably mounted in the case and connected by wires 10 and 11 and a suitable switch 12, indicated in diagram in Figure 2 but not shown otherwise in the drawings, to a battery or other suitable source of electric current 13. The end brackets 2 are provided with notches and flanges 14 adapted to retain the body 1 in position and the whole is held together by a bolt 15 extending through the center of the core 8.

When it is desired to use the device, the switch 12 is closed, the resistance wire 9 becomes heated and heats the air in the space 16 surrounding the central core which sets up a circulation of warm air flowing outward through the opening 5 and is directed forward by the guide 6 so that it flows up along the surface of the glass. By mounting the device on the framework rather than on the wind shield itself and by the use of the flange 6 the device is operated with even more efficiency when the windshield is partly open because the air then strikes against the sloping wind shield and flows along it, but in either case it is found by experience that the current of heated air maintains its position close to the glass and thus maintains its purpose of keeping rain, sleet, and ice from accumulating on the glass.

I claim as my invention and desire to secure by Letters Patent:

In combination, a cylindrical outer case having one of its ends removable, said ends being provided with flanges adapted to attach to the framework of an automobile, said case having a longitudinally extending opening and an integrally formed outwardly and inwardly extending flange at one side of said opening; a tubular member mounted within said case and having at its extremities flanges adapted to retain it in concentric position within said case and having a spiral groove on the main body of said member; a bolt extending longitudinally through said member and said heads to retain the whole in position, and a resistance coil mounted in said groove and connected by suitable wires to a source of electrical supply.

LAURENCE P. LYNCH.